United States Patent [19]
Rudder

[11] 3,902,741
[45] Sept. 2, 1975

[54] WHEEL FITTING FOR BOATS

[76] Inventor: Rupert Rushby Rudder, 14 Ray Ave., Vaucluse, N.S.W., Australia

[22] Filed: July 25, 1974

[21] Appl. No.: 491,738

[30] Foreign Application Priority Data
Jan. 11, 1974  Australia............................ 6232/74

[52] U.S. Cl. ................................. 280/414 A; 9/1 T
[51] Int. Cl.² ........................................... B60P 3/10
[58] Field of Search .......................... 280/414; 9/1 T

[56] References Cited
UNITED STATES PATENTS

| | | | |
|---|---|---|---|
| 2,673,991 | 4/1954 | Dahlkuist | 9/1 T |
| 2,967,719 | 1/1961 | Williams | 280/414 A |
| 3,134,111 | 5/1964 | Atwood | 280/414 A X |
| 3,689,950 | 9/1972 | Valowiecki | 9/1 T |
| 3,738,684 | 6/1973 | Lusk | 280/414 A |

*Primary Examiner*—Leo Friaglia
*Assistant Examiner*—R. Schrecengost
*Attorney, Agent, or Firm*—Pravel & Wilson

[57] ABSTRACT

Trailer wheels mounted on a boat comprising port and starboard fillings each comprising a swing mounted frame, a spring axle mounted on the frame and a wheel on the axle. The frame may be swung from a ground-running position wherein the wheel projects below the boat to a sea-going position wherein the wheel is above the bottom of the boat. Latch means are provided to releasably lock the frame in each position.

5 Claims, 8 Drawing Figures

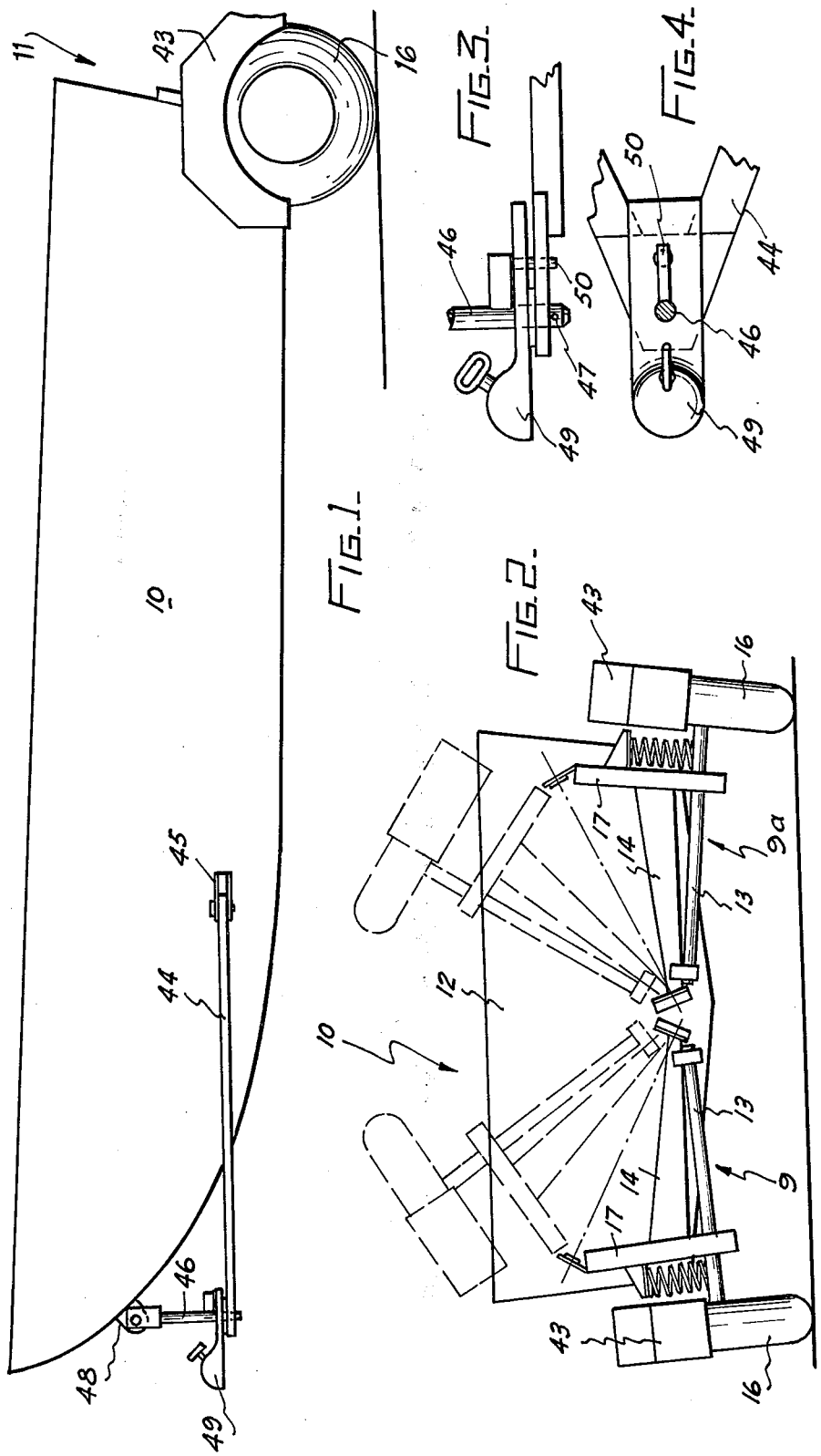

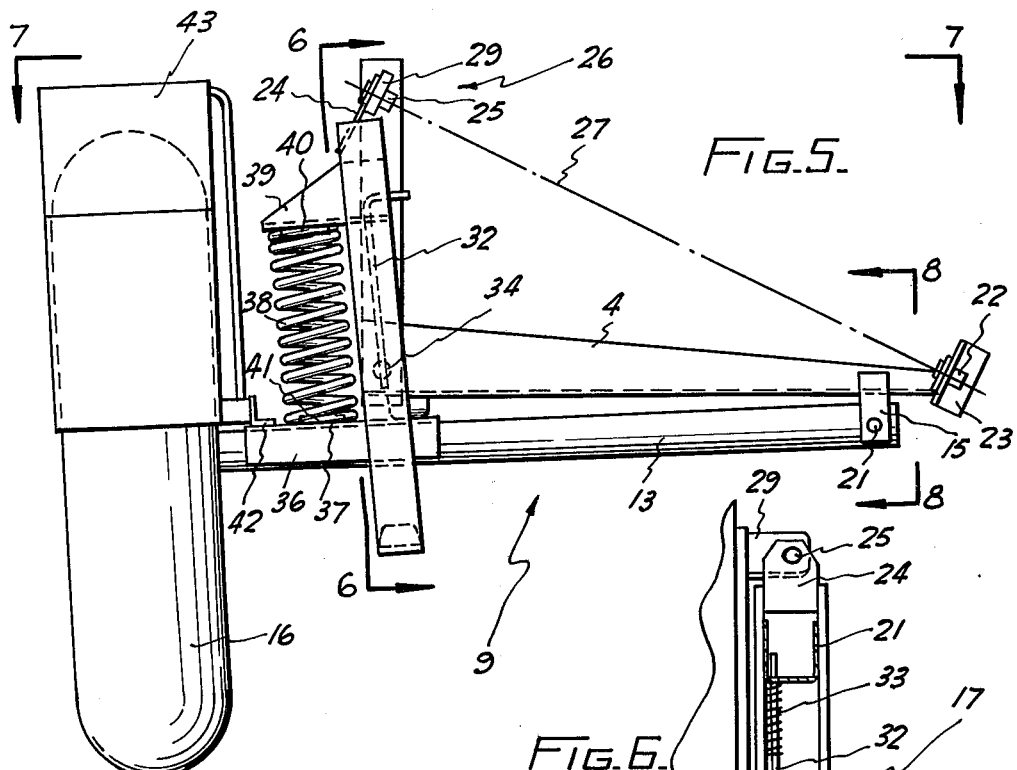
FIG.5.
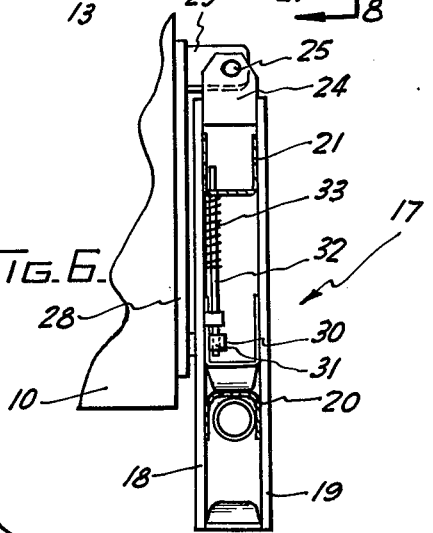
FIG.6.
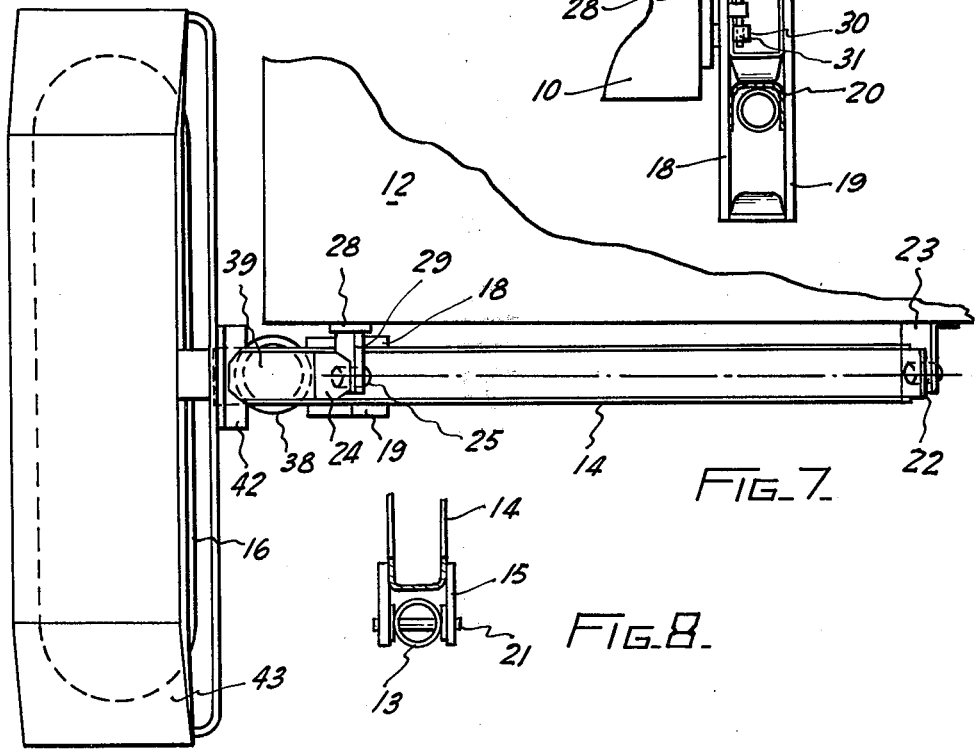
FIG.7.
FIG.8.

WHEEL FITTING FOR BOATS

This invention provides wheel arrangements for small boats, which are required at times to be transported over land.

According to current practice such boats are usually transported on roof racks of motor vehicles, or are towed on trailers. Loading and unloading of the boats onto and from the roof racks or trailers are tedious operations requiring much time and physical work.

It is an object of the invention to provide wheel arrangements adapted to be mounted on a boat, to enable the boat to be trailed as one mobile unit.

The invention consists in wheel arrangements for a boat comprising a starboard wheel fitting and a port wheel fitting each comprising a wheel suspension, a ground wheel rotatably mounted on said suspension, hinge means securing said suspension to the transom of the boat and permitting said suspension to swing about an upwardly and outwardly inclined axis extending athwart the boat such that the suspension may be swung from a ground running position wherein the wheel projects below the boat to a sea going position wherein the wheel is above the bottom of the boat, and latch means releasably to hold the suspension in each said position.

By way of example a preferred embodiment of the invention is described hereinafter with reference to the accompanying drawings, wherein, FIG. 1 is a side elevation of a boat having mounted thereon wheel arrangements in accordance with the invention, in their ground running position.

FIG. 2 is a rear elevation of the boat and wheel arrangements of FIG. 1 showing in phantom the wheel arrangements in their sea going position.

FIG. 3 is a side elevation of a tow hitch for the boat of FIG. 1.

FIG. 4 is a plan view of the tow hitch of FIG. 3.

FIG. 5 is an enlarged rear elevation of a port wheel fitting being a component of the arrangements of FIG. 1.

FIG. 6 is a view taken on the line 6—6 in FIG. 5.

FIG. 7 is a plan view of the wheel fitting of FIG. 5, and

FIG. 8 is a view taken on the line 8—8 in FIG. 5.

In the illustrated embodiment the wheel arrangements in accordance with the invention consists of a port wheel fitting 9 and a starboard wheel fitting 9A hingedly mounted to ransom 12 of a boat 10 symmetrically with respect to the fore and aft axis thereof. Apart from their respective left-hand and right-hand characters the two wheel fittings are identical and thus only one of the wheel fittings needs to be described in detail.

The port wheel fitting 9 includes a suspension comprising an axle 13 having a wheel 16 rotatably mounted on one end thereof. The other end of the axle 13 is connected to a structural element 14, which in this embodiment is a channel-sectioned member. The structural element 14 has welded or otherwise secured to one end thereof a hinge pin 22 rotatably engaging a flange of a right-angled bracket 23, the other flange of which is secured to the transom 12 of the boat 10 adjacent to the bottom and the fore and aft axis thereof. A guide 17 is at the other end of the structural element 14. It comprises two elongated parallel metal plates 18 and 19 respectively welded or otherwise secured to the flanges of the element 14. The guide 17 straddles the axle 13 and has a projecting flange 24 fixedly secured to its upper portion and bridging the plates 18 and 19. The axle 13 is therefore retained within the guide 17 so that its movement perpendicular to the general plane containing the element 14 and the guide 17 is prevented. The projecting flange 24 is provided with a hinge pin 25 rotatably engaging a hinge bracket 26 mounted on the transom 12 of the boat 10. The hinge pin 25 is in alignment with the pin 22 so that they together define a hinge axis 27 about which the wheel fitting 9 may swing. The hinge bracket 26 may comprise a mounting strip 28 secured to the transom 12 by screw means or the like, and a projecting flange 29 upstanding from an upper portion thereof for engagement with the hinge pin 25. An anchorage pin 30 is at the lower end of the mounting strip 28. The pin 30 is adapted to extend through a clearance hole 34 in the plate 18 of the guide 17. The pin 30 has a transversely extending hole 31 adapted to receive therein the end of a latch member 32 slidably mounted on the inner side of the plate 18 and spring loaded by a spring 33 so as normally to assume an extended position. Hence, by engaging the guide 17 with the anchorage pin 30 and then inserting the latch member 32 into the hole 31, the wheel fitting 9 may be locked in the ground running position shown in FIG. 5.

So as to absorb shock transmitted from the wheels 16 during transit overland, the axle 13 in this embodiment is hingedly connected to the structural element 14 by way of a bracket 15 welded or otherwise secured thereto and a hinge pin 21, so that the axle 13 is able to swing about the pin 21 and is therefore slidable within the guide 17. The axle 13 is provided with an inverted channel-sectioned member 20 which embraces the portion of the axle 13 straddled by the guide 17 and presents its web 37 as a seat for a coil spring 38 located between it and a channel-sectioned abutment 39 fixedly secured to the guide 17 by its flanges. Locating protrusions 40 and 41 are respectively provided on the webs of the member 20 and the abutment 39 to locate the coil spring 38 in position. The member 20 loosely fits between the plates 18 and 19 and acts as a slipper for the axle 13 to slide against those plates. The axle 13 is able to swing upwardly against the action of the spring 38 which, in use, absorbs shock transmitted from the wheel 16. When it is required to transport the boat 10 overland, the guide 17, of each wheel fitting is secured to the anchorage pin 30 by the respective latch member 32. The axles of the wheel fitting are therefore kept in a ground engaging position wherein the wheels protrude beyond the bottom of the boat 10. When the boat has been launched, the latch member 32 in each guide 17 is manually retracted. Each of the wheel fittings can then be swung about its respective hinge axis 27 through 180° to the sea going position wherein the wheels 16 are above the bottom of the boat 10, as shown in phantom in FIG. 2. The locus traced out by each axle 13 during the swing is a substantially part-conical surface. The wheel fitting may be locked in its sea going position by engaging the guides 17 with anchorage pins (not shown) similar to the pins 30, or by other means secured to the transom 12 of the boat 10.

A bracket 42 may be fixed to the channel-sectioned member 36 for mounting a mud guard 43 for the wheel 16.

In other embodiments of the invention the end of each axle further from the wheel may be provided with a hinge pin and be directly hinged to the transom of the boat. The guide 17 may be replaced by a cylindrical housing accomodating a coil spring. The housing may be provided with a skirt portion slotted with two diametral slots and straddling the axle such that the latter may swing upwardly within the slots against the action of the spring in the housing. A lug provided with a clearance hole and a latch member may be mounted on the side of the cylindrical housing to engage with an anchorage pin secured to the boat transom, thereby to lock the wheel fitting half in the ground running position. The housing may be hinged to the transom 12 in a manner similar to that employed for mounting the guide 17 in the preferred embodiment. The connection of the axles to the transom may be in any convenient form and may comprise a ball-and-socket joint.

It will be appreciated that when the wheel arrangements of the invention is in the sea going position the wheels are not obstructive to any out-board motor or rudder on the rear of the boat. If desired however, the wheels may each be mounted on a short stub-axle adapted to be connected to the main portion of the axle by a spigot-and socket joint, thus forming an extension of the axle. The stub-axle may be retained on the axle by locking pins, through-bolts or the like. The wheels can then be taken off the axle after the boat is launched.

In a simplified embodiment of the invention, each axle 13 may be fixedly secured to the structural element 14 and to a strut replacing the guide 17. The spring 38 is then dispensed with.

To facilitate towing a boat furnished with wheel arrangements according to the invention a tow hitch may be secured to the boat. The hitch may consist of two radius bars 44 releasably attached to two brackets 45 each secured to a respective side of the bow of the boat. The bars 44 may be attached to the bracket 45 by removable pins, so as to allow the hitch to be detached from the boat after the latter has arrive at its destination.

The radius bars 44 converge and meet at the front of the boat and are engaged by a dropper rod 46 extending through aligned holes provided in the front of each of the bars 44. The bars 44 are kept in engagement with the rod 46 by a removable pin 47 engaging the lower end thereof. The upper end of the rod 46 is attached to a lug 48 on the stem of the boat. Fixedly secured to the bar 46 intermediate the ends thereof is a conventional tow-bar socket 49 adapted to engage with a tow-ball mounted on a towing vehicle. The rod 46 has an abutment pin 50 fixedly connected thereto. The pin 50 extends through the socket 49, thereby locking it to the rod 46, and between the bars 44 so as to limit the angle of swing of the bars 44 about the rod 46. This facilitates the manoeuvring of the towing vehicle when backing the boat.

The claims defining the invention are as follows:

1. Wheel arrangements for a boat comprising a starboard wheel fitting and a port wheel fitting each comprising a wheel suspension, a ground wheel rotatably mounted on said suspension with hinge means securing said suspension to the transom of the boat and permitting said suspension to swing about an upwardly and outwardly inclined axis extending athwart the boat, such that the suspension may be swung from a ground running position wherein the wheel projects below the boat to a sea going position wherein the wheel is above the bottom of the boat, and latch means releasably to hold the suspension in each said position.

2. Wheel arrangements according to claim 1 wherein each suspension comprises a structural member, an axle guide fixed to the structural member, an axle pivotted to the structural member, and a spring extending from a seat on the guide to a seat on the axle; it being the structural member and guide which are hinged to the transom.

3. Wheel arrangements according to claim 2 including stops to limit movement of the axle within the guide.

4. A boat furnished with wheel arrangements according to claim 1 and having a detachable, bow-mounted tow hitch.

5. A boat according to claim 4 wherein said hitch comprises a dropper rod extending downwardly from a point on the stem of the boat, two radius bars respectively extending from points on the bows of the boat abaft the stem to the foot of the dropper rod and a tow ball socket affixed to and located by said rod and bars where they meet; said rod and bars all being detachably secured each to each and to the boat.

* * * * *